(12) United States Patent
Koduka et al.

(10) Patent No.: US 11,884,256 B2
(45) Date of Patent: Jan. 30, 2024

(54) CONTROL DEVICE

(71) Applicant: DENSO CORPORATION, Kariya (JP)

(72) Inventors: Kenta Koduka, Kariya (JP); Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/147,919

(22) Filed: Dec. 29, 2022

(65) Prior Publication Data

US 2023/0134514 A1 May 4, 2023

Related U.S. Application Data

(63) Continuation of application No. PCT/JP2021/021858, filed on Jun. 9, 2021.

(30) Foreign Application Priority Data

Jun. 30, 2020 (JP) ................................. 2020-113141

(51) Int. Cl.
| | |
|---|---|
| *B60W 10/08* | (2006.01) |
| *B60W 10/10* | (2012.01) |
| *B60W 50/00* | (2006.01) |
| *F16H 59/68* | (2006.01) |
| *F16H 61/00* | (2006.01) |

(52) U.S. Cl.
CPC ............ *B60W 10/08* (2013.01); *B60W 10/10* (2013.01); *B60W 2050/0083* (2013.01); *B60W 2510/083* (2013.01); *F16H 2059/6823* (2013.01); *F16H 2061/0087* (2013.01)

(58) Field of Classification Search
CPC ........................... B60W 10/08; F16H 63/3466
See application file for complete search history.

(56) References Cited

U.S. PATENT DOCUMENTS

| | | |
|---|---|---|
| 2015/0314770 A1 | 11/2015 | Kitabatake et al. |
| 2016/0025214 A1 | 1/2016 | Yoshida |
| 2019/0381976 A1 | 12/2019 | Kamio |

FOREIGN PATENT DOCUMENTS

| | | | |
|---|---|---|---|
| JP | H01-112434 U | | 7/1989 |
| JP | 2008-039711 A | | 2/2008 |
| JP | 2009041622 A | * | 2/2009 |
| JP | 2017082884 A | * | 5/2017 |

* cited by examiner

*Primary Examiner* — Derek D Knight
(74) *Attorney, Agent, or Firm* — Oliff PLC

(57) ABSTRACT

A control device includes a motor control unit that controls an electric motor, a shift control unit that controls a shift by wire system of a movable body, and a torque detection unit that detects torque applied to a power transmission mechanism. The shift control unit drives an actuator unit so that the power transmission mechanism locked by a lock mechanism is unlocked, based on a change of a shift range of the shift by wire system from a parking range to a non-parking range. The motor control unit controls output of the electric motor depending on detected torque of the torque detection unit, based on the change of the shift range of the shift by wire system from the parking range to the non-parking range.

5 Claims, 12 Drawing Sheets

CONTROL DEVICE

CROSS-REFERENCE TO RELATED APPLICATION

The present application is based on and claims the benefit of priority from earlier Japanese Patent Application No. 2020-113141 filed Jun. 30, 2020, the description of which is incorporated herein by reference.

BACKGROUND

Technical Field

The present disclosure relates to a control device.

Related Art

A shift by wire system is known as a shift system for changing a shift range. In the shift by wire system, in a state in which mechanical connection between a shift range change mechanism and a shift lever of the vehicle is removed, an operation state of the shift lever is detected by a sensor and the shift range change mechanism is driven by a shift actuator based on the detected operation information on the shift lever to change the shift range.

SUMMARY

As an aspect of the present disclosure, a control device for a movable body is provided. The movable body has an electric motor that transmits torque to a rotating body via a power transmission mechanism to cause the movable body to travel, a lock mechanism that is capable of changing the power transmission mechanism between a locked state and an unlocked state, and an actuator unit that drives the lock mechanism. The control device includes: a motor control unit that controls the electric motor; a shift control unit that controls a shift by wire system of the movable body; and a torque detection unit that detects torque applied to the power transmission mechanism. When a shift range that is changeable in the shift by wire system and is other than a parking range is defined as a non-parking range, the shift control unit drives the actuator unit so that the power transmission mechanism locked by the lock mechanism is unlocked, based on a change of the shift range of the shift by wire system from the parking range to the non-parking range, and the motor control unit controls output of the electric motor depending on detected torque of the torque detection unit, based on the change of the shift range of the shift by wire system from the parking range to the non-parking range.

DETAILED DESCRIPTION OF THE PREFERRED EMBODIMENTS

Figure 1:
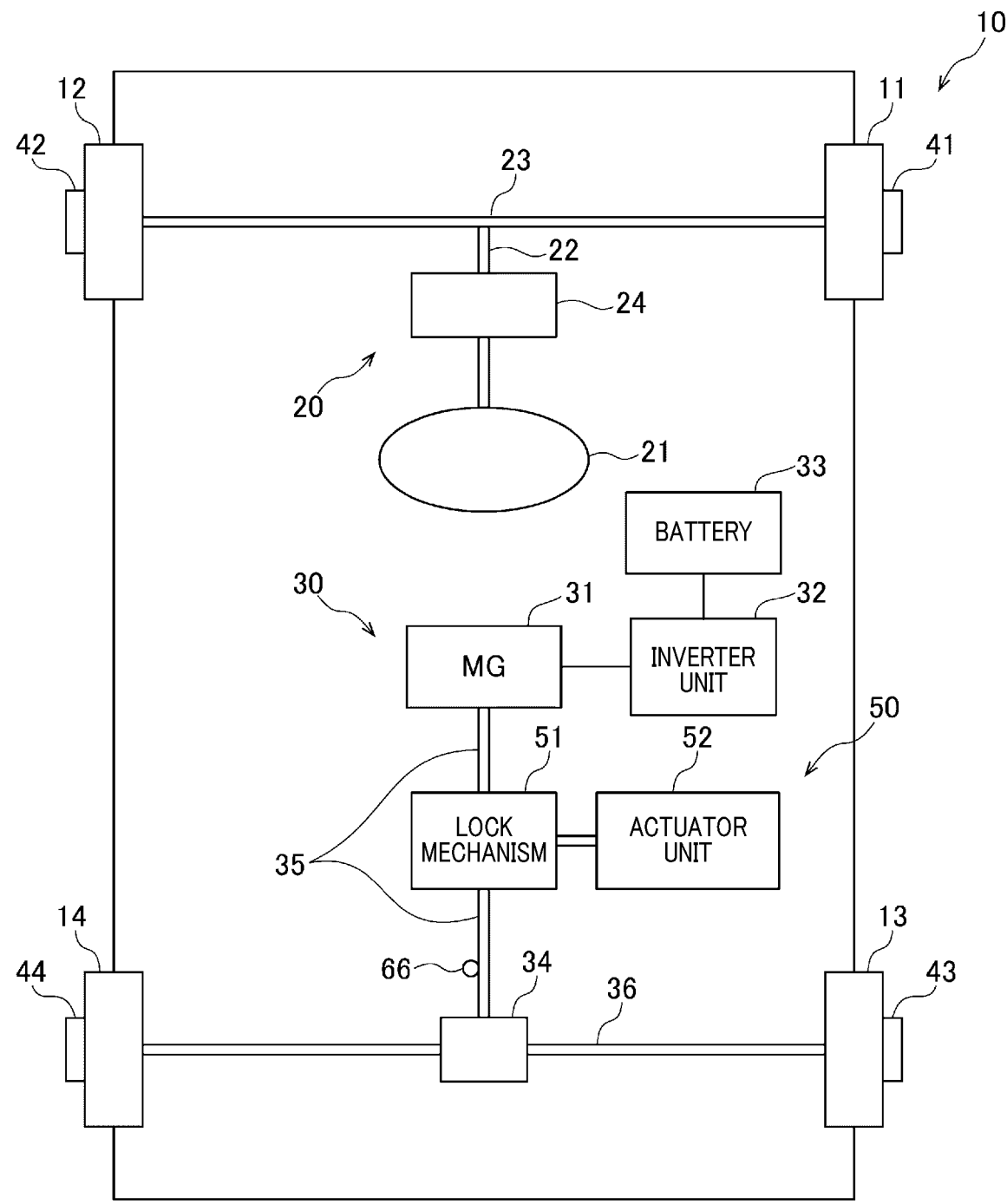
FIG. 1 is a block diagram illustrating a schematic configuration of a vehicle according to an embodiment.

A shift by wire system is known as a shift system for changing a shift range. In the shift by wire system, in a state in which mechanical connection between a shift range change mechanism and a shift lever of the vehicle is removed, an operation state of the shift lever is detected by a sensor and the shift range change mechanism is driven by a shift actuator based on the detected operation information on the shift lever to change the shift range.

In the shift range change mechanism of such a shift by wire system, a parking lock mechanism is installed which locks a power transmission shaft of wheels so that the wheels do not rotate when the shift lever is set to a parking range. The parking lock mechanism includes a parking gear that rotates integrally with the power transmission shaft, and a parking pawl that is displaced integrally with the shift range change mechanism. In the parking lock mechanism, when the shift lever is set to a P range, the parking pawl engages with the parking gear, whereby rotation of the power transmission shaft is locked. The parking pawl is displaced based on power transmitted from the shift actuator.

When the vehicle is parked on a sloping road, force due to gravity acts on the vehicle in the front-back direction. Since torque is applied to the wheels based on the force acting on the vehicle in the front-back direction, the torque of the wheels is transmitted to the parking gear via the power transmission shaft, whereby large force may be applied to a portion at which the parking gear and the parking pawl engage with each other. When the shift lever is operated from the parking range to another range, the parking lock mechanism is required to release the parking gear locked by the parking pawl. When large force is applied to the portion at which the parking gear and the parking pawl engage with each other, torque required for the shift actuator to release the parking gear and the parking pawl becomes large. This is a factor in the size of the shift actuator becoming increased.

Hence, according to the vehicle disclosed in JP 2018-167655 A, when it is detected that the vehicle is parked on a sloping road, an electrical parking brake unit automatically actuates a parking brake to decrease force applied to a portion at which a parking gear and a parking pawl engage with each other. Thus, since torque required for a shift actuator become small, the shift actuator can be decreased in size.

The vehicle disclosed in JP 2018-167655 requires that the electrical parking brake unit generates braking force that can keep the vehicle in a stopped state when the vehicle is parked on a sloping road. Hence, when the vehicle is kept in a stopped state on an assumed maximum gradient (e.g., a gradient of 20%) of the sloping road, since large power is required of an actuator of the electrical parking brake unit, increase in size and cost of the actuator cannot be avoided. In the first place, a vehicle in which an electrical parking brake unit is not installed cannot employ such a configuration disclosed in JP 2018-167655.

The above problems occur not only in vehicles and are common to any movable bodies.

The present disclosure aims to provide a control device that can reduce power required for an actuator unit with a simpler configuration.

Hereinafter, an embodiment of a control device of a vehicle will be described with reference to the drawings. To facilitate understanding the description, the same components in the drawings are denoted by the same reference as possible to omit redundant descriptions.

First, a schematic configuration of the vehicle in which the control device of the embodiment is installed will be described.

A vehicle 10 of the present embodiment illustrated in FIG. 1 is a so-called electrically driven vehicle that travels with a motor generator 31 as a power source. In the present embodiment, the vehicle 10 corresponds to a movable body. As illustrated in FIG. 1, the vehicle 10 includes a steering unit 20, a power system 30, brake units 41 to 44, and a shift by wire (SBW) system 50.

The steering unit 20 is configured so that when a driver rotates a steering wheel 21, steering torque applied to the steering wheel 21 is transmitted to a steering mechanism 23 via a steering shaft 23, whereby steering angles of a right front wheel 11 and a left front wheel 12 are changed. The steering unit 20 includes an actuator unit 24. The actuator unit 24 applies assist torque depending on steering torque applied to the steering wheel 21, to assist steering operation by the driver.

The power system 30 includes a motor generator (MG) 31, an inverter unit 32, a battery 33, and a differential gear 34.

The inverter unit 32 convers DC power supplied from the battery 33 to three-phase AC power and supplies the converted three-phase AC power to the motor generator 31.

The motor generator 31 operates as an electrical motor when the vehicle 10 is accelerating. When the motor generator 31 operates as an electrical motor, the motor generator 31 is driven based on the three-phase AC power supplied from the inverter unit 32. Power of the motor generator 31 is transmitted to a right rear wheel 13 and a left rear wheel 14 via a power transmission shaft 35, the differential gear 34, and a drive shaft 36 to apply torque to the rear wheels 13, 14, whereby the vehicle 10 accelerates The motor generator 31 can operate as a generator when the vehicle 10 is decelerating. When operating as a generator, the motor generator 31 performs regenerative operation to generate electricity. The regenerative operation of the motor generator 31 applies braking force to the wheels 13, 14. Three-phase AC power generated by the regenerative operation of the motor generator 31 is converted to DC power by the inverter unit 32 and is charged into the battery 33.

As described above, in the vehicle 10 of the present embodiment, the right rear wheel 13 and the left rear wheel 14 function as drive wheels, and the right front wheel 11 and the left front wheel 12 function as follower wheels. Hereinafter, the right rear wheel 13 and the left rear wheel 14 are also collectively referred to as drive wheels 13, 14, for the sake of convenience.

In the present embodiment, the motor generator 31 corresponds to an electric motor. The power transmission shaft 35, the differential gear 34, and a drive shaft 36 correspond to a power transmission mechanism that transmits output torque of the motor generator 31 to the drive wheels 13, 14. The drive wheels 13, 14 correspond to a rotating body.

The brake units 41 to 44 are respectively provided to the wheels 11 to 14 of the vehicle 10. Each of the brake units 41 to 44 includes a rotor that rotates integrally with the corresponding one of the wheels 11 to 14, a brake pad disposed so as to face the rotor, and a hydraulic circuit that applies hydraulic power to the brake pad to cause the brake pad to contact the rotor or separate from the rotor. In the brake units 41 to 44, when the brake pad contacts the rotor by hydraulic power of the hydraulic circuit, frictional force is applied to the rotor, thereby applying braking force to the wheels 11 to 14.

The SBW system 50 detects an operation range of a shift lever of the vehicle 10 by a sensor and electrically changes a shift range of the vehicle 10 based on the detected position of the shift lever by the actuator unit. In the vehicle 10, the operation range of the shift lever can be selectively changed among a parking range, a drive range, a neutral range, a reverse range, and the like. (In the vehicle 10, the shift lever can be selectively changed among parking, drive, neutral, reverse, and the like.) Hereinafter, the operation ranges other than the parking range are referred to as a non-parking range, for the sake of convenience. The SBW system 50 of the present embodiment has a so-called parking lock function that locks the power transmission shaft 35 when the operation range of the shift lever is changed from the non-parking range to the parking range and unlocks the power transmission shaft 35 when the operation range of the shift lever is changed from the parking range to the non-parking range. The SBW system 50 includes, as a configuration for implementing the parking lock function, a lock mechanism 51 and an actuator unit 52.

Figure 2:
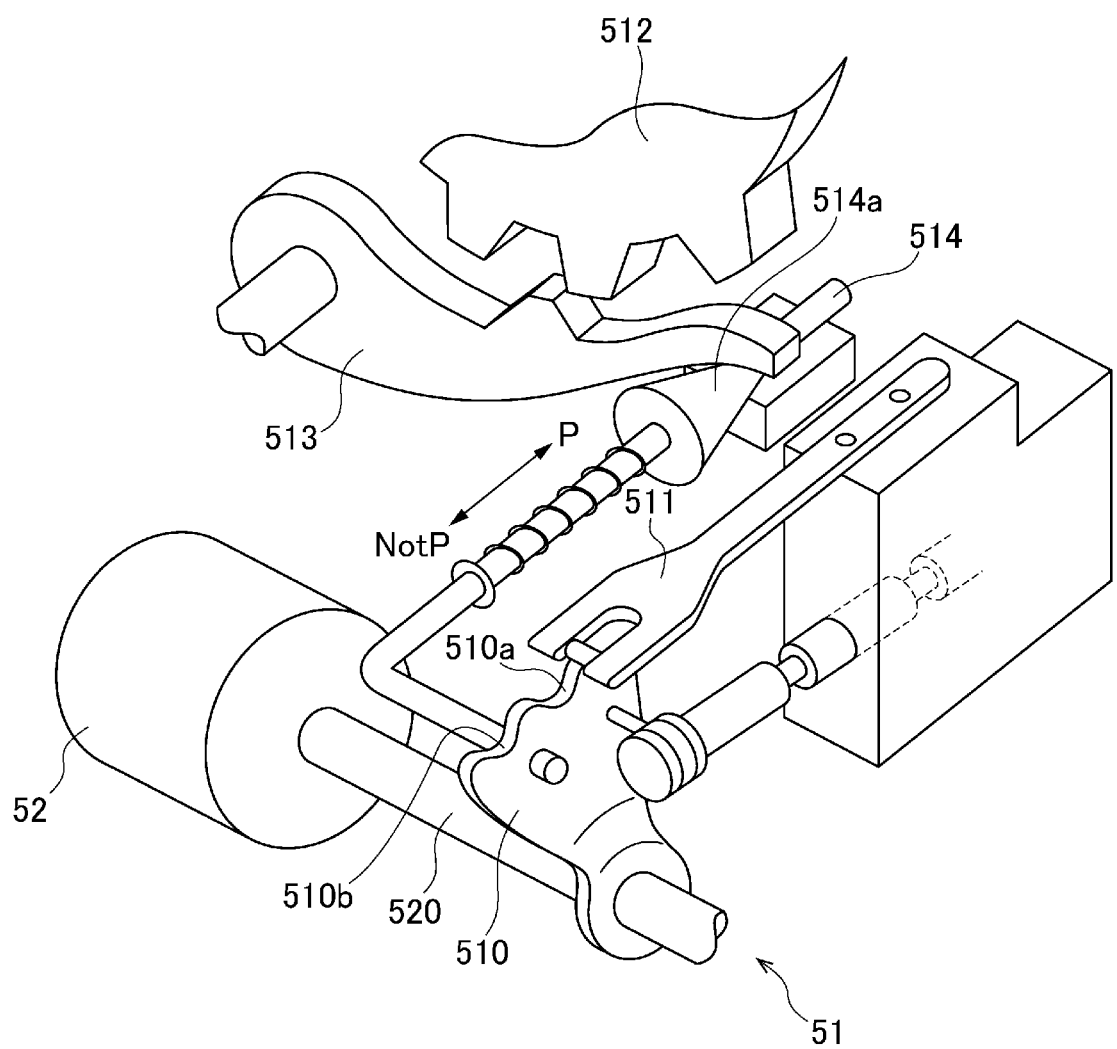
FIG. 2 is a perspective view illustrating a structure of a lock mechanism according to the embodiment.

As illustrated in FIG. 2, the lock mechanism 51 includes a detent plate 510 and a detent spring 511. The detent plate 510 rotates integrally with an output shaft 520 of the actuator unit 52. The detent spring 511 fits to any of a plurality of concave portions 510a, 510b formed on the outer edge of the detent plate 510.

The lock mechanism 51 further includes a parking gear 512, a parking pawl 513, and a parking rod 514. The parking gear 512 rotates integrally with the power transmission shaft 35 illustrated in FIG. 1. The parking pawl 513 can approach and separate from the parking gear 512. The parking rod 514 is coupled with the detent plate 510.

When the detent plate 510 is located at a rotational position at which the detent spring 511 fits to the concave portion 510a, since the parking pawl 513 and the parking gear 512 does not engage with each other, rotation of the power transmission shaft 35 is not locked. Hereinafter, the state of the lock mechanism 51 when the detent spring 511 is fitted to the concave portion 510a is referred to as an unlocked state, for the sake of convenience.

When the detent plate 510 is located at a rotational position at which the detent spring 511 fits to the concave portion 510b, a conical body 514a provided to an end portion of the parking rod 514 is pushed to the underside of the parking pawl 513, whereby the parking pawl 513 is pushed upward. Thus, the parking pawl 513 and the parking gear 512 engage with each other, whereby rotation of the power transmission shaft 35 is locked. Hereinafter, the state of the lock mechanism 51 when the detent spring 511 is fitted to the concave portion 510b is referred to as a locked state, for the sake of convenience.

Next, an electrical configuration of the vehicle 10 will be described.

Figure 3:
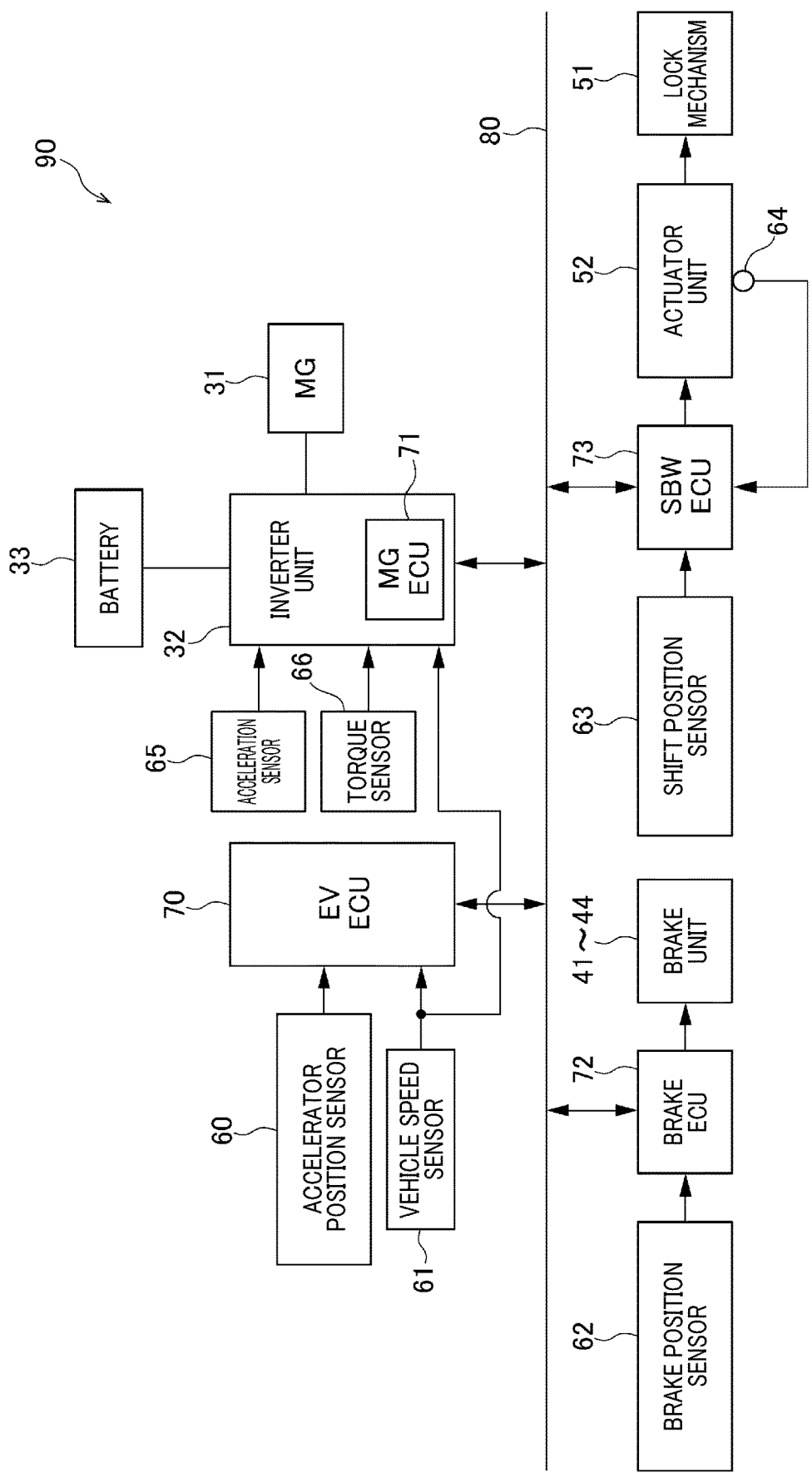
FIG. 3 is a block diagram illustrating a schematic configuration of a control device of the vehicle according to the embodiment.

As illustrated in FIG. 3, the vehicle 10 includes an accelerator position sensor 60, a vehicle speed sensor 61, a brake position sensor 62, a shift position sensor 63, a rotation sensor 64, an acceleration sensor 65, and a torque sensor 66. The vehicle 10 includes, as parts performing various controls, an electric vehicle (EV) electronic control unit (ECU) 70, an MGECU 71, a brake ECU 72, and an SBWECU 73. These elements 60 to 66, 70 to 73 configure a control device 90 of the vehicle 10.

The accelerator position sensor 60 detects the depression amount of an accelerator pedal of the vehicle 10 and outputs a signal corresponding to the detected depression amount of the accelerator pedal. The vehicle speed sensor 61 detects a vehicle speed, which is a traveling speed of the vehicle 10, and outputs a signal corresponding to the detected vehicle speed to the EVECU 70 and the inverter unit 32. The brake position sensor 62 determines whether a brake pedal of the vehicle 10 has been depressed and outputs a signal corresponding to the detected operation position of the brake pedal to the brake ECU 72. The shift position sensor 63 detects an operation range of the shift lever of the vehicle 10 and outputs a signal corresponding the detected operation range to the SBWECU 73. The rotation sensor 64 detects a rotation angle of the output shaft 520 of the actuator unit 52 illustrated in FIG. 2 and outputs a signal corresponding to the detected rotation angle to the SBWECU 73. The acceleration sensor 65 detects an acceleration of the vehicle 10 in the traveling direction, in other words, an acceleration of the vehicle 10 in the front-back direction, and outputs a signal corresponding to the detected acceleration of the vehicle 10 to the inverter unit 32. The torque sensor 66 is provided to the power transmission shaft 35 illustrated in FIG. 1, and detects torque applied to the power transmission shaft 35 and outputs a signal corresponding to the detected torque to the inverter unit 32.

The ECUs 70 to 73 are mainly configured by a microcomputer having a CPU, a ROM, a RAM, and the like and executes a program previously stored in the ROM to perform various controls. The ECUs 70 to 73 can transmit/receive various pieces of information to/from each other via an in-vehicle network 80 such as CAN installed in the vehicle 10.

The MGECU 71 is provided to the inverter unit 32. The MGECU 71 drives the inverter unit 32 to change the amount of current-carrying of the motor generator 31, thereby controlling output torque of the motor generator 31. Specifically, the MGECU 71 receives target torque, which is a target value of output torque of the motor generator 31, from the EVECU 70. The MGECU 71 controls the inverter unit 32 so that torque depending on the target torque is output to the motor generator 31. When the vehicle 10 decelerates, for example, the MGECU 71 controls the inverter unit 32 so that the motor generator 31 performs regenerative power generation. In the present embodiment, the MGECU 71 corresponds to a motor control unit.

The brake ECU 72 drives the brake units 41 to 44 based on the operation position of the brake pedal detected by the brake position sensor 62 to cause the vehicle 10 to generate braking force.

The SBWECU 73 detects an operation range of the shift lever based on an output signal of the shift position sensor 63. When detecting that the detected operation range has been changed, the SBWECU 73 sets a target shift range of the SBW system 50 to the changed operation range. Then, the SBWECU 73 controls the actuator unit 52 based on the set target shift range. For example, when the target shift range has changed from the non-parking range to the parking range, the SBWECU 73 drives the actuator unit 52 so that the lock mechanism 51 becomes a locked state. In this case, power cannot be transmitted between the motor generator 31 and the drive wheels 13, 14. In contrast, when the target shift range has changed from the parking range to the non-parking range, the SBWECU 73 drives the actuator unit 52 so that the lock mechanism 51 becomes an unlocked state. In this case, power can be transmitted between the motor generator 31 and the drive wheels 13, 14.

As described above, the SBWECU 73 of the present embodiment locks the power transmission shaft 35 based on the change of the operation range of the shift lever from the non-parking range to the parking range, and unlocks the power transmission shaft 35 based on the change of the operation range of the shift lever from the parking range to the non-parking range. In the present embodiment, the SBWECU 73 corresponds to a shift control unit.

Figure 4:
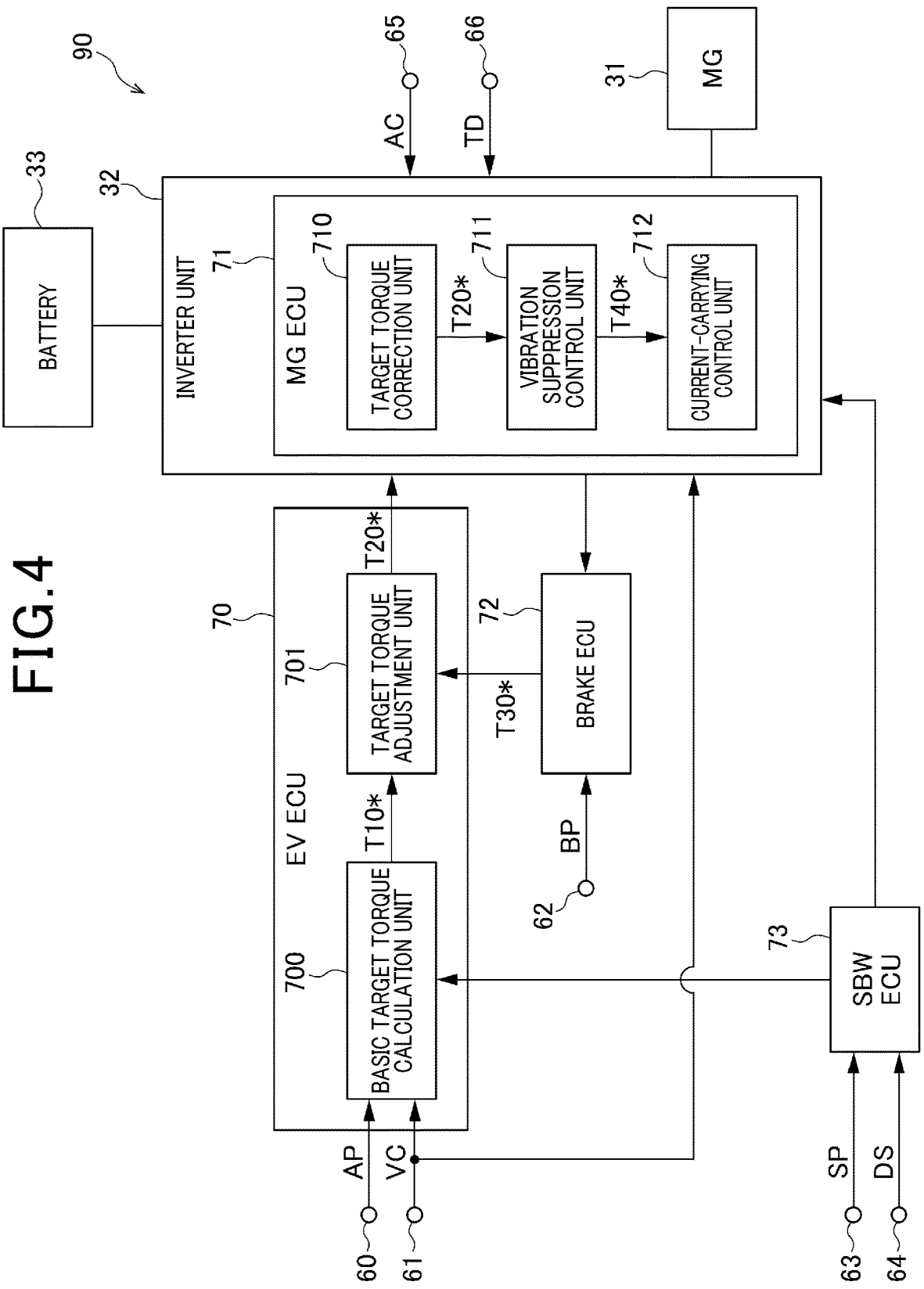
FIG. 4 is a block diagram illustrating a schematic configuration of the control device of the vehicle according to the embodiment.

The EVECU 70 integrally controls the vehicle 10. Specifically, as illustrated in FIG. 4, the EVECU 70 includes a basic target torque calculation unit 700, and a target torque adjustment unit 701.

The basic target torque calculation unit 700 acquires information on a depression amount AP and a vehicle speed VC of the accelerator pedal based on an output signal of the accelerator position sensor 60 and an output signal of the vehicle speed sensor 61. The basic target torque calculation unit 700 acquires information on an operation range SP of the shift lever from the SBWECU 73. The basic target torque calculation unit 700 has a plurality of maps for calculating basic target torque T10* from the depression amount AP of the accelerator pedal and the vehicle speed VC. The plurality of maps are previously prepared so as to respectively correspond to a plurality of operation ranges that the shift lever can operate. The basic target torque calculation unit 700 determines one of the plurality of maps to be used, based on the information on the operation range SP of the shift lever and calculates the basic target torque T10* from the determined map based on the depression amount AP of the accelerator pedal and the vehicle speed VC. The basic target torque calculation unit 700 outputs the calculated basic target torque T10* to the target torque adjustment unit 701.

The target torque adjustment unit 701 sets a target torque T20* based on the basic target torque T10* output from the basic target torque calculation unit 700 and a braking target torque T30* output from the brake ECU 72. Specifically, when the braking command has not been transmitted from the brake ECU 72, the target torque adjustment unit 701 sets the target torque T20* to the basic target torque T10* without change. When the brake ECU 72 has detected that the brake pedal has been depressed based on an operation position BP of the brake pedal detected by the brake position sensor 62, the brake ECU 72 transmits a braking command including the braking target torque T30* to the EVECU 70. The braking target torque T30* is a target value of torque in the braking direction to be output from the motor generator 31 in order to decelerate the vehicle 10. When the brake ECU 72 has transmitted the braking command, the target torque adjustment unit 701 sets the target torque T20* to the basic target torque T30* included in the braking command, instead of the basic target torque T10*. The target torque adjustment unit 701 transmits the set target torque T20* to MGECU 71.

The MGECU 71 sets a current-carrying control value of the motor generator 31 based on the target torque T20* transmitted from the EVECU 70 and controls the inverter unit 32 based on the set current-carrying control value. Hence, electrical power depending on the current-carrying control value is suppled from the inverter unit 32 to the motor generator 31, and torque depending on the target torque T20* is output to the motor generator 31.

Figure 5:
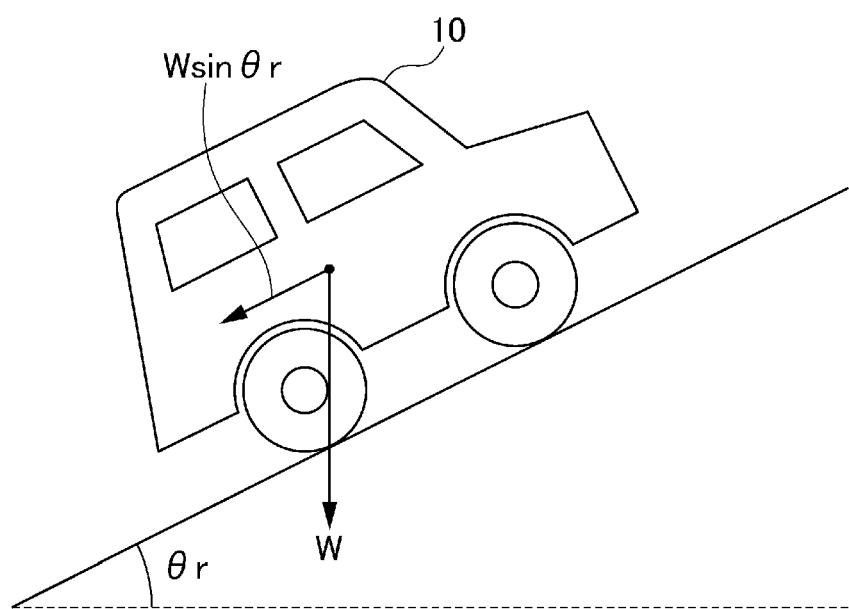
FIG. 5 is a diagram schematically illustrating force acting on the vehicle that is stopped on a sloping road.

When the vehicle 10 is stopped on an uphill road as illustrated in FIG. 5, if a road surface gradient is set as θr, and gravity acting on the vehicle is set as W, power "W*sin (θr)" in the backward-traveling direction acts on the vehicle 10. The road surface gradient θr indicates a gradient of a road surface of an uphill by a positive value and indicates a gradient of a road surface of a downhill by a negative value. After the vehicle 10 stops, when the operation range of the shift lever is set to the parking range, the lock mechanism 51 illustrated in FIG. 2 becomes a locked state. That is, the parking gear 512 and the parking pawl 513 engage with each other.

Since torque is applied to the drive wheels 13, 14 by applying the power "W*sin (θr)" in the backward-traveling direction, when the torque is applied to the drive shaft 36, the drive shaft 36 is subjected to torsion. Torque depending on the amount of torsion of the drive shaft 36 is transmitted to the lock mechanism 51 via the differential gear 34 and the power transmission shaft 35, whereby large force is applied to a portion at which the parking gear 512 and the parking pawl 513 of the lock mechanism 51 engage with each other. Thereafter, when the operation range of the shift lever is changed from the parking range to the non-parking range, torque of the actuator unit 52 required for removing the parking pawl 513 from the parking gear 512 becomes large. This is a factor that the actuator unit 52 is increased in size.

Hence, in the vehicle 10 of the present embodiment, when the operation range of the shift lever is changed from the parking range to the non-parking range, torque that can reduce force applied to the portion at which the parking gear 512 and the parking pawl 513 engage with each other is output from the motor generator 31, and the lock mechanism 51 is shifted from a locked state to an unlocked state by the actuator unit 52. That is, when the lock mechanism 51 is released, the motor generator 31 and the actuator unit 52 are subjected to cooperative control. Hence, since the torque required for the actuator unit 52 can be reduced, as a result, the actuator unit 52 can be decreased in size.

Next, the cooperative control of the motor generator 31 and the actuator unit 52 performed when the lock mechanism 51 is released will be described in detail.

As illustrated in FIG. 4, the MGECU 71 includes a target torque correction unit 710, a vibration suppression control unit 711, and a current-carrying control unit 712.

The target torque correction unit 710 corrects target torque T20*, which is output from the EVECU 70, so that torque that can reduce force applied to the portion at which the parking gear 512 and the parking pawl 513 engage with each other is output from the motor generator 31. Specifically, the target torque correction unit 710 performs a process illustrated in FIG. 6 and FIG. 7 to correct the target torque T20*. The target torque correction unit 710 repeats the process illustrated in FIG. 6 and FIG. 7 at predetermined intervals.

Figure 6:
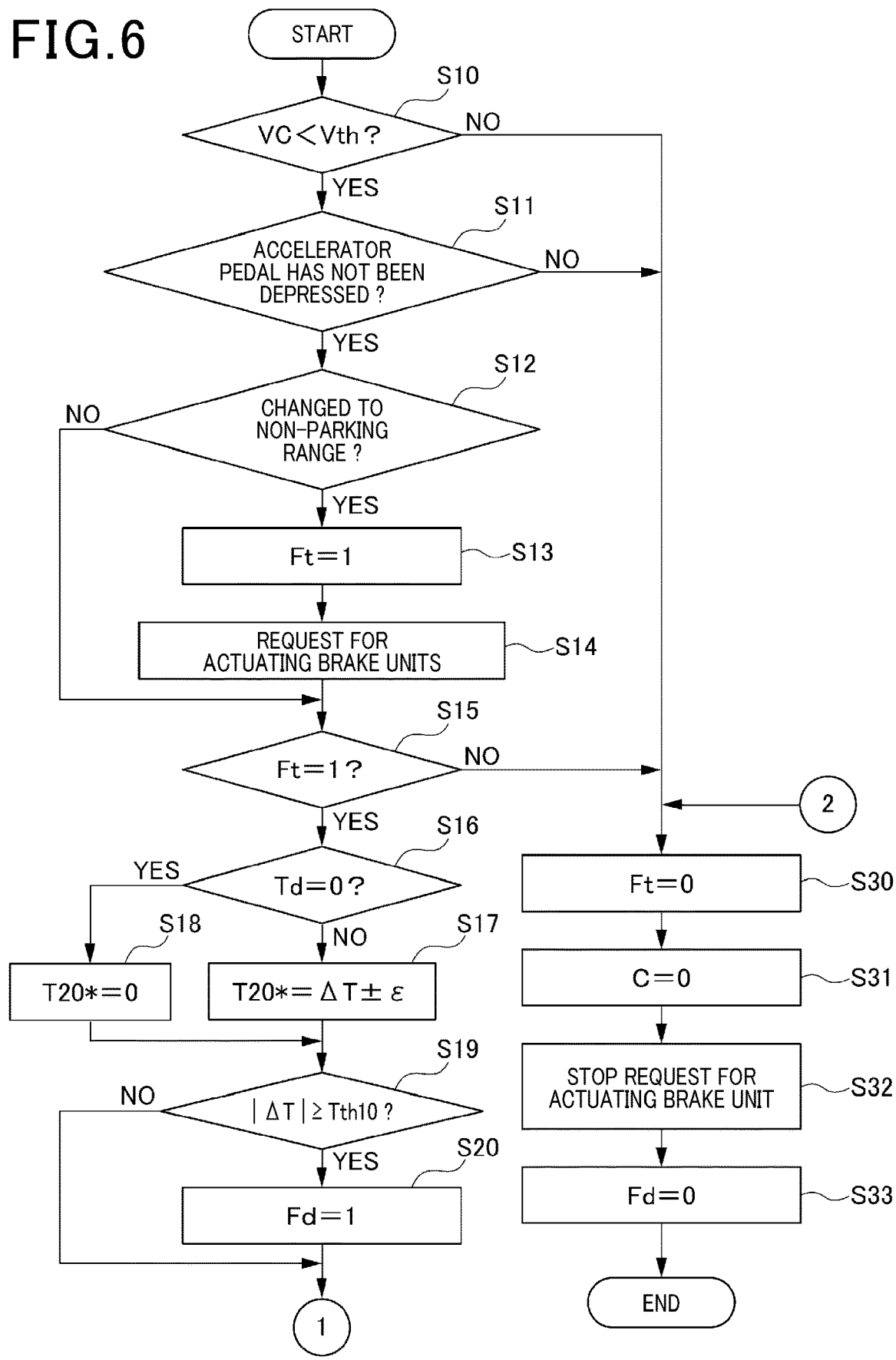
FIG. 6 is a flowchart illustrating part of a procedure of a process performed by the control device of the vehicle according to the embodiment.

As illustrated in FIG. 6, first, as processing in step S10, the target torque correction unit 710 determines whether the vehicle speed VC detected by the vehicle speed sensor 61 lower than a predetermined speed Vth. The predetermined speed Vth is previously set by experiment or the like so that it can be determined whether the vehicle 10 is stopped, and is stored in the ROM of the MGECU 71.

If a positive determination is made in the processing in step S10, that is, if the vehicle 10 is stopped, as processing in step S11, the target torque correction unit 710 determines whether the accelerator pedal is not depressed based on the depression amount AP of the accelerator pedal detected by the accelerator position sensor 60.

If a negative determination is made in the processing in step S10 or the processing in step S11, in other words, if the vehicle 10 is traveling, or if the accelerator pedal is depressed, as processing in step S30, the target torque correction unit 710 sets a torque correction flag Ft to "0". If the torque correction flag Ft is set to "0", the target torque correction unit 710 outputs the target torque T20* calculated by the basic target torque calculation unit 700 to the vibration suppression control unit 711 without change. As processing in step S31, the target torque correction unit 710 sets a value of a counter C to "0". As processing in step S32, if the target torque correction unit 710 has requested the brake ECU 72 to actuate the brake, the target torque correction unit 710 stops the request. As processing in step S33, after setting a delay request flag Fd to "0", the target torque correction unit 710 halts the process illustrated in FIG. 6 and FIG. 7.

If positive determinations are made in the processing in step S10 and the processing in step S11, in other words, if the vehicle 10 is stopped and the accelerator pedal is not depressed, as processing in step S12, the target torque correction unit 710 determines whether the target shift range that can be acquired from the SBWECU 73 has been changed from the parking range to the non-parking range. If a negative determination is made in the processing in step S12, that is, if the target shift range has not been changed from the parking range to the non-parking range, as processing in step S15, the target torque correction unit 710 determines whether the torque correction flag Ft is "1". Since the torque correction flag Ft is to "0", the target torque correction unit 710 makes a negative determination in the processing in step S15. Hence, the target torque correction unit 710 performs the processing in steps S30 to S33.

If a positive determination is made in the processing in step S12, that is, if the target shift range is changed from the parking range to the non-parking range, as processing in step S13, after setting the torque correction flag Ft to "1", as processing in step S14, the target torque correction unit 710 requests the brake ECU 72 to actuate the brake units. When the brake ECU 72 has been requested to actuate the brake units by the MGECU 71, the brake ECU 72 actuates the brake units 41 to 44 to keep the vehicle 10 in a stopped state. The reason to actuate the brake units 41 to 44 will be described below.

When the lock mechanism 51 is unlocked, the MGECU 71 of the present embodiment output, from the motor generator 31, torque that can reduce force applied to the portion at which the parking gear 512 and the parking pawl 513 of the lock mechanism 51 engage with each other. When the output torque of the motor generator 31 is corrected, if the absolute value of the output torque of the motor generator 31 becomes large, when the lock mechanism 51 is unlocked, the output torque of the motor generator 31 is transmitted to the drive wheels 13, 14, whereby the vehicle 10 may travel forward or backward. Since the vehicle 10 travels forward or backward without intention of the driver, the driver may feel anomalous. Hence, in the present embodiment, in order to suppress such unintended behavior of the vehicle 10, the brake units 41 to 44 are actuated.

When the processing in step S13 is performed, since the torque correction flag Ft is set to "1", the target torque correction unit 710 makes a positive determination in the processing in step S15. In this case, as processing in step S16, the target torque correction unit 710 determines whether detected torque Td of the torque sensor 66, that is, torque applied to the power transmission shaft 35 is 0. The processing in step S16 corresponds to processing for determining whether the drive shaft 36 has been subjected to torsion. The processing in step S16 may determine whether the torque Td of the power transmission shaft 35 is smaller than a predetermined value. The predetermined value is previously set by experiment or the like so that it can be determined whether torque is applied to the power transmission shaft 35, and is stored in the ROM of the MGECU 71.

If a negative determination is made in the processing in step S16, that is, if the torque Td of the power transmission shaft 35 is not 0, the target torque correction unit 710 determines that the torque for reducing the force applied to the engaged portion of the lock mechanism 5 is required to be output from the motor generator 31. In this case, as processing in step S17, the target torque correction unit 710 corrects the target torque T20* of the motor generator 31. Specifically, the target torque correction unit 710 calculates a basic torque correction amount ΔT based on the torque Td of the power transmission shaft 35 detected by the torque sensor 66, and sets the target torque T20* to a value obtained by adding/subtracting a learning value ε to/from the calculated basic torque correction amount ΔT.

The basic torque correction amount ΔT is a reference value of the torque to be output from the motor generator 31 to reduce the force applied to the portion at which the parking gear 512 and the parking pawl 513 engage with each other. As the absolute value of the gradient θr of the road surface on which the vehicle 10 is stopped increases, the amount of torsion of the drive shaft 36 increases. Hence, the absolute value |ΔT| of the basic torque correction amount is required to be set to a larger value. Between a case in which the road surface gradient θr is a positive value and a case in which the road surface gradient θr is a negative value, in other words, between a case of an uphill road and a case of a downhill road, the sign of the basic torque correction amount ΔT is reversed between positive and negative.

If the drive shaft 36 is subjected to torsion, torque depending on the amount of torsion is transmitted to the power transmission shaft 35. Hence, there is a correlative relationship between the amount of torsion of the drive shaft 36 and the torque Td of the power transmission shaft 35 detected by the torque sensor 66. Hence, in the present embodiment, the basic torque correction amount ΔT is set based on the torque Td of the power transmission shaft 35 detected by the torque sensor 66.

Figure 8:
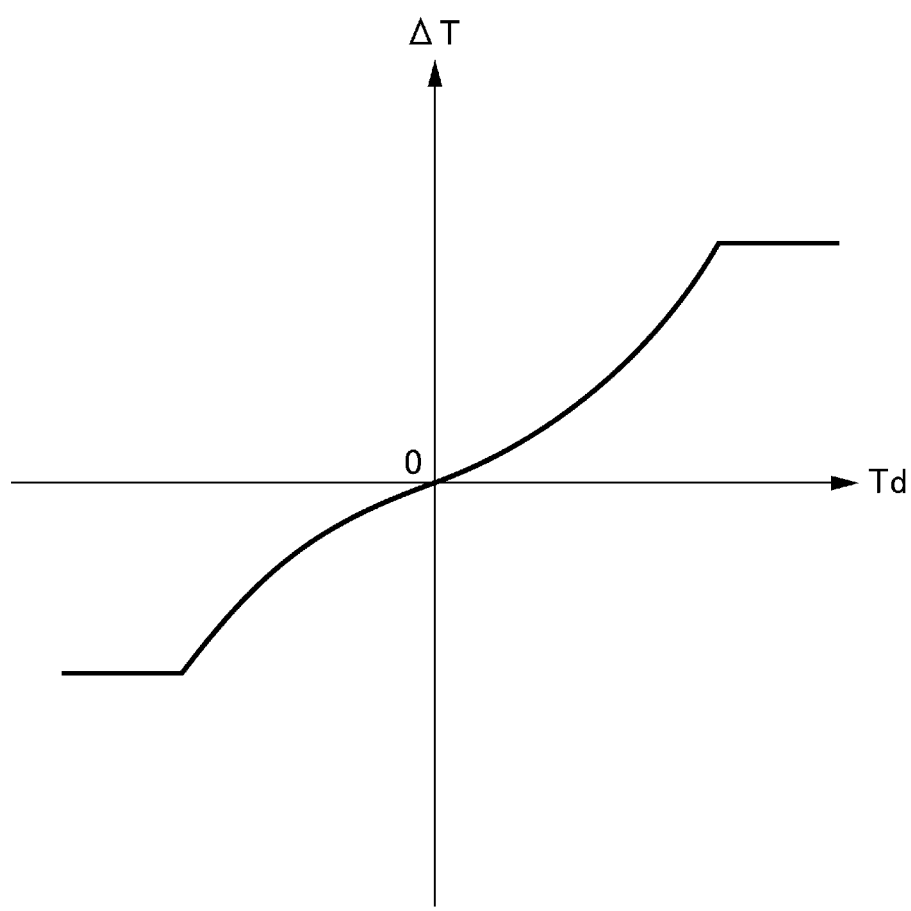
FIG. 8 is a map that is used by the control device of the vehicle according to the embodiment and illustrates a relationship between torque Td detected by a torque sensor and a torque correction amount $\Delta T$.

Specifically, as a map illustrating a relationship between the torque Td of the power transmission shaft 35 detected by the torque sensor 66 and the basic torque correction amount ΔT, for example, a map illustrated in FIG. 8 is previously obtained by experiment or the like and is stored in the ROM of the MGECU 71. As processing in step S17 illustrated in FIG. 6, the target torque correction unit 710 calculates the basic torque correction amount ΔT from the torque Td detected by the torque sensor 66, based on the map illustrated in FIG. 8.

The output torque of the motor generator 31 required to reduce the force applied to the portion at which the parking gear 512 and the parking pawl 513 of the lock mechanism 51 engage with each other may change due to, for example, variations or aged deterioration of products such as the motor generator 31 and the differential gear 34f Hence, in a case of a configuration in which the target torque T20* of the motor generator 31 is merely set to the previously determined basic torque correction amount ΔT, the force applied to the engaged portion of the lock mechanism 51 may not be appropriately reduced under the influence of variations, aged deterioration, or the like of the products.

Hence, the MGECU 71 of the present embodiment learns the variation amount of the torque correction amount under the influence of variations, aged deterioration, or the like of the products and adds/subtracts the learning value ε to/from the basic torque correction amount ΔT, whereby a more accurate torque correction amount can be calculated. The learning value ε is set by the process illustrated in FIG. 9. When the basic torque correction amount ΔT is a positive value, that is, when the vehicle 10 is stopped on an uphill road, the target torque correction unit 710 adds the learning value ε to the basic torque correction amount ΔT to set the target torque T20*. In contrast, when the basic torque correction amount ΔT is a negative value, that is, when the vehicle 10 is stopped on a downhill road, the target torque correction unit 710 subtracts the learning value ε from the basic torque correction amount ΔT to set the target torque T20*. A specific procedure of the process illustrated in FIG. 9 will be described later. In the present embodiment, "ΔT±ε" corresponds to a correction amount of output torque of the electric motor.

As described above, as processing in step S17, the target torque correction unit 710 calculates the basic torque correction amount ΔT based on the torque Td of the power transmission shaft 35 detected by the torque sensor 66, and sets the target torque T20* to a value obtained by adding/subtracting the learning value ε to/from the calculated basic torque correction amount ΔT. In the present embodiment, this process corresponds to output control of the electric motor depending on detected torque of a torque detection unit. Hereinafter, this control is referred to as torque correction control. The target torque correction unit 710 outputs the calculated target torque T20* to the vibration suppression control unit 711.

In contrast, if a positive determination is made in the processing in step S16, that is, if the torque Td of the power transmission shaft 35 is 0, the target torque correction unit 710 determines that the torque for reducing the force applied to the engaged portion of the lock mechanism 5 is not required to be output from the motor generator 31. In this case, as processing in step S18, the target torque correction unit 710 sets the target torque T20* to 0. If the target torque T20* is set to 0, the MGECU 71 does not perform the torque correction control. Thus, if the torque Td of the power transmission shaft 35 detected by the torque sensor 66 is 0, or the torque Td is smaller than the predetermined value, the MGECU 71 does not perform the torque correction control.

After the processing in step S17 or the processing in step S18 is performed, as processing in step S19, the target torque correction unit 710 determines whether the absolute value |ΔT| of the basic torque correction amount is a predetermined value Tth or more. Basically, in the vehicle 10 of the present embodiment, if torque depending on a torque correction amount "ΔT+ε" is output from the motor generator 31, the force applied to the portion at which the parking gear 512 and the parking pawl 513 of the lock mechanism 51 engage with each other can be reduced, whereby the actuator unit 52 may be operated so as to release the locked state. However, when large force is applied to the engaged portion, if the lock mechanism 51 is promptly unlocked at the time point at which the motor generator 31 has performed the torque correction control depending on the torque correction amount "ΔT+ε", a shock in the lock mechanism 51 may be difficult to absorb.

Specifically, if the force applied to the portion at which the parking gear 512 and the parking pawl 513 engage with each other becomes large, after the motor generator 31 starts the torque correction control depending on the torque correction amount "ΔT+ε", a certain amount of time is required until the force applied to the engaged portion is reduced. Hence, if the lock mechanism 51 is promptly unlocked at the time point at which the torque correction control of the motor generator 31 is started, a shock in the lock mechanism 51 may not be able to absorb. In such a case, unlocking the lock mechanism 51 after a predetermined time period has elapsed from the time point at which the motor generator 31 has performed the torque correction control depending on the torque correction amount "ΔT+ε" is effective in absorbing the shock.

Hence, the target torque correction unit 710 compares the absolute value |ΔT| of the basic torque correction amount with the predetermined value Tth to determine whether to delay unlocking the lock mechanism 51. In the present embodiment, a relationship between a shock caused in the lock mechanism 51 due to unlocking and the absolute value |ΔT| of the basic torque correction amount is obtained by experiment or the like. Based on the result of the experiment or the like, the predetermined value Tth is previously set to a value that can determine whether to delay unlocking the lock mechanism 51. The predetermined value Tth is stored in the ROM of the MGECU 71.

If the absolute value |ΔT| of the basic torque correction amount is the predetermined value Tth or more, the target torque correction unit 710 makes a positive determination in the processing in step S19. After setting the delay request flag Fd to "1" as successive processing in step S20, the target torque correction unit 710 performs processing in step S21 and later illustrated in FIG. 7. When the delay request flag Fd is set to "1", the MGECU 71 transmits a delay request to the SBWECU 73. On receiving the delay request, even when the target shift range is changed from the parking range to the non-parking range, the SBWECU 73 does not drive the actuator unit 52 to keep the lock mechanism 51 in a locked state.

In contrast, if the absolute value |ΔT| of the basic torque correction amount is less than the predetermined value Tth, the target torque correction unit 710 makes a negative determination in the processing in step S19. Then, without performing the processing in step S20, the target torque correction unit 710 performs processing in step S21 and later. In this case, since the delay request flag Fd is set to "0", the MGECU 71 does not transmit a delay request to the SBWECU 73. Hence, the SBWECU 73 drives the actuator unit 52 based on the change of the target shift range from the parking range to the non-parking range, to shift the lock mechanism 51 from the locked state to the unlocked state.

Figure 7:
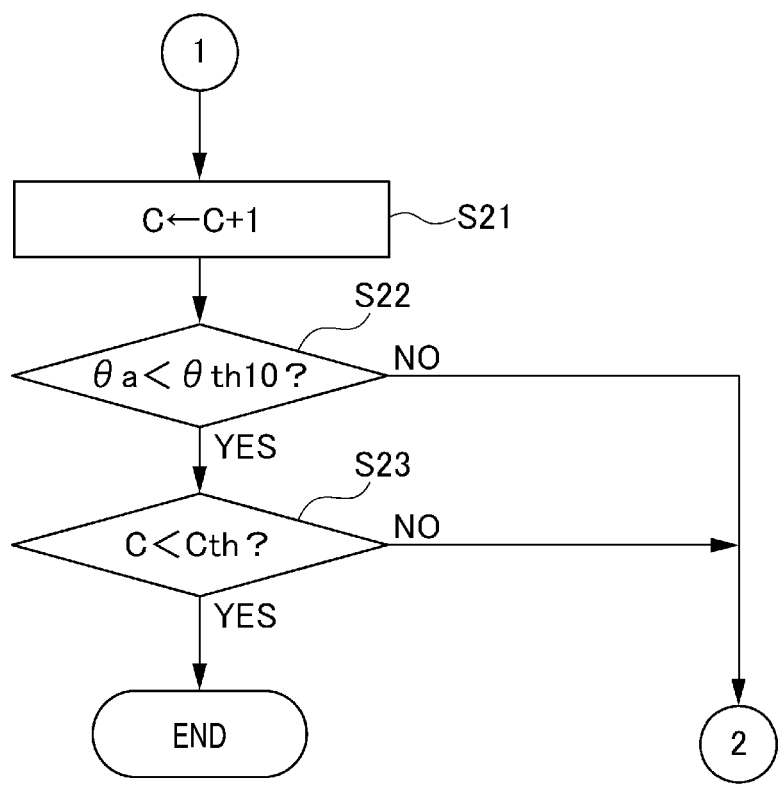
FIG. 7 is a flowchart illustrating part of the procedure of the process performed by the control device of the vehicle according to the embodiment.

As illustrated in FIG. 7, after incrementing a value of the counter C as processing in step S21, as processing in step S22, the target torque correction unit 710 determines whether a rotation angle θa of the actuator unit 52 detected by the rotation sensor 64 is less than a predetermined value θth10. The predetermined value θth10 is previously set to a value by which it can be determined whether the lock mechanism 51 illustrated in FIG. 2 has shifted from a locked state to an unlocked state. The predetermined value θth10 is stored in the ROM of the MGECU 71.

If the target torque correction unit 710 makes a positive determination in the processing in step S22, that is, if the rotation angle θa of the actuator unit 52 is less than the predetermined value θth10, as processing in step S23, the target torque correction unit 710 determines whether the value of the counter C is less than a predetermined delay value Cth. The delay value Cth is previously set by experiment or the like so that it can be determined whether a predetermined time period, during which a shock in the lock mechanism 51 can be reduced, has elapsed from the time point at which the torque correction control of the motor generator 31 starts. The delay value Cth is stored in the ROM of the MGECU 71.

If the target torque correction unit 710 makes a positive determination in the processing in step S23, that is, if the predetermined time period has not elapsed from the time point at which the torque correction control of the motor generator 31 starts, the target torque correction unit 710 halts the process illustrated in FIG. 6 and FIG. 7.

In contrast, if the target torque correction unit 710 makes a negative determination in the processing in step S22 or the processing in S23, that is, if the lock mechanism 51 has shifted from a locked state to an unlocked state, or if the predetermined time period has elapsed from the time point at which the torque correction control starts, the target torque correction unit 710 performs the processing in steps S30 to S33 illustrated in FIG. 6. In this case, as processing in step S30, the target torque correction unit 710 changes the value of the torque correction flag Ft from "1" to "0". Thus, the torque correction control is stopped. As processing in step S31, the target torque correction unit 710 resets the value of the counter C to "0". In addition, as processing in step S32, if the target torque correction unit 710 has requested the brake ECU 72 to operate the brake, the target torque correction unit 710 stops the request. Hence, the operation of the brake units 41 to 44 stops. As processing in step S33, the target torque correction unit 710 change the value of the delay request flag Fd from "1" to "0". If the delay request flag Fd is set to "0", the MGECU 71 transmits a delay cancellation request to the SBWECU 73. If receiving the delay cancellation request, the SBWECU 73 actuates the actuator unit 52 to shift the lock mechanism 51 from the locked state to the unlocked state.

As illustrated in FIG. 4, the target torque correction unit 710 outputs the target torque T20*, which is set through the process illustrated in FIG. 6, to the vibration suppression control unit 711. The vibration suppression control unit 711 performs vibration suppression control that corrects the target torque T20* so as to suppress vibration due to torsion of the drive shaft 36. For example, the vibration suppression control unit 711 subjects the target torque T20* to filtering processing based on a notch filter that attenuates frequency components of torsional resonance of the drive shaft 36. When a sensor that can detect a rotation angle of the drive shaft 36 is provided to the vehicle 10, the vibration suppression control unit 711 may detect torsional resonance of the drive shaft 36 based on a change of the rotation angle of the drive shaft 36 detected by the sensor and correct the target torque T20* by feedback control so as to cancel the vibration. The target torque correction unit 710 outputs the corrected target torque T20* to the current-carrying control unit 712 as final target torque T40*.

The current-carrying control unit 712 calculates a current-carrying control value of the motor generator 31 based on the final target torque T40*, and controls the inverter unit 32 based on the current-carrying control value. Hence, the inverter unit 32 supplies electrical power depending on the current-carrying control value to the motor generator 31. Then, the motor generator 31 outputs torque depending on the final target torque T40*.

Next, with reference to FIG. 9, a procedure of a process of setting the learning value ε used in the processing in step S17 illustrated in FIG. 6 will be described. The target torque correction unit 710 repeats the process illustrated in FIG. 9 at predetermined intervals. The initial value of the learning value ε is 0.

Figure 9:
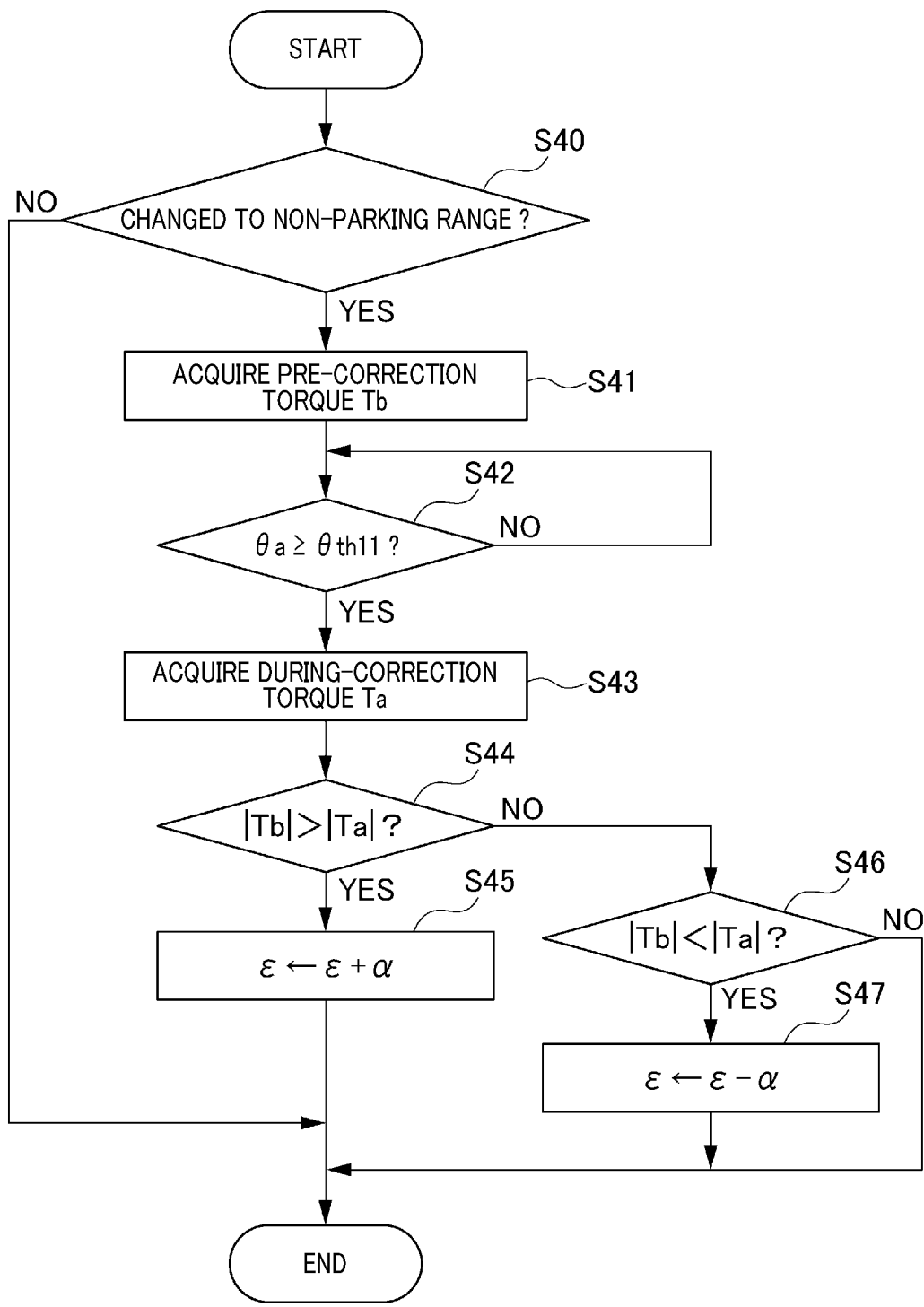
FIG. 9 is a flowchart illustrating a procedure of a process performed by the control device of the vehicle according to the embodiment.

As illustrated in FIG. 9, first, as processing in step S40, the target torque correction unit 710 determines whether the target shift range, which can be acquired from the SBWECU 73, has changed from the parking range to the non-parking range. If a positive determination is made in the processing in step S40, as processing in step S41, the target torque correction unit 710 acquires torque detected by the torque sensor 66 as pre-correction torque Tb. The pre-correction torque Tb corresponds to torque applied to the power transmission mechanism immediately before the torque correction control is performed.

As processing in step S42 subsequent to the step S41, the target torque correction unit 710 determines whether the rotation angle θa of the actuator unit 52 detected by the rotation sensor 64 has reached a predetermined value θth11. The predetermined value th11 is previously set to a value by which it can be determined whether the torque correction control is being performed, and is stored in the ROM of the MGECU 71. If a positive determination is made in the processing in step S42, that is, if the torque correction control is being performed, as processing in step S43, the target torque correction unit 710 acquires torque detected by the torque sensor 66 as during-correction torque (in-correction torque) Ta. The during-correction torque Ta corresponds to torque applied to the power transmission mechanism when the torque correction control is being performed.

As processing in step S44 subsequent to the step S43, the target torque correction unit 710 determines whether the absolute value |Tb| of the pre-correction torque is more than the absolute value |Ta| of the during-correction torque. If a positive determination is made in the processing in step S42, that is, if the absolute value |Tb| of the pre-correction torque is more than the absolute value |Ta| of the during-correction torque, as processing in step S45, the target torque correction unit 710 sets a new learning value ε to a value obtained by adding a predetermined value α to the current learning value ε, and thereafter halts the process illustrated in FIG. 9. The predetermined value a is a predetermined positive value and is set to, for example "1 [Nm]".

If a negative determination is made in the processing in step S44, as processing in step S46, the target torque correction unit 710 determines whether the pre-correction torque Tb is less than the during-correction torque Ta. If a positive determination is made in the processing in step S46, that is, if the absolute value |Tb| of the pre-correction torque is less than the absolute value |Ta| of the during-correction torque, as processing in step S47, the target torque correction unit 710 sets the new learning value ε to a value obtained by subtracting the predetermined value α from the current learning value ε, and thereafter halts the process illustrated in FIG. 9.

If a negative determination is made in the processing in step S46, that is, if the pre-correction torque Tb is equal to the during-correction torque Ta, the target torque correction unit 710 does not correct the learning value ε and halts the process illustrated in FIG. 9.

Next, a learning manner of the learning value ε will be described with reference to FIG. 10.

Figure 10:
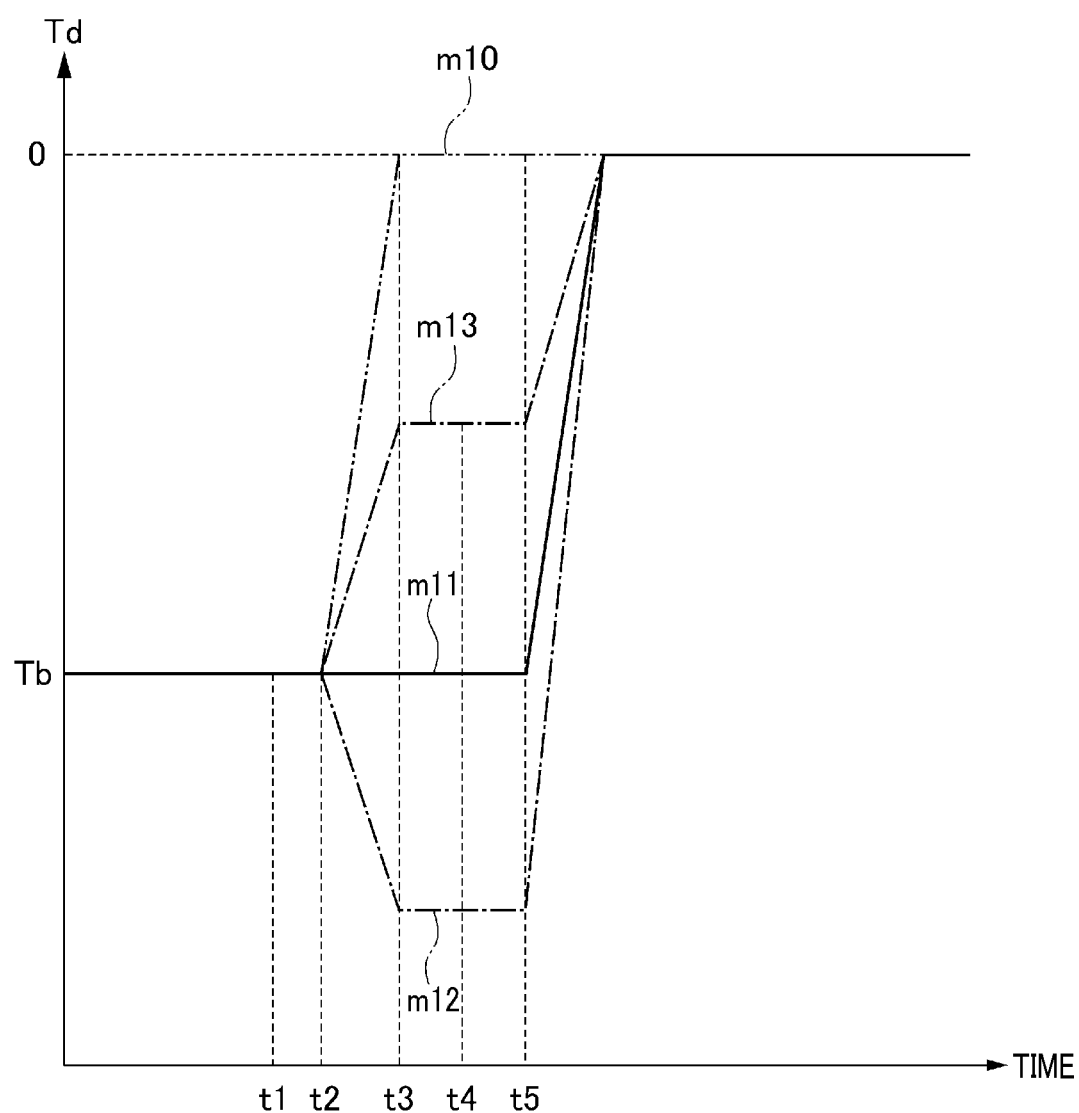
FIG. 10 is a time diagram illustrating an example of a change of torque of a power transmission shaft.

For example, when the vehicle 10 is stopped on an uphill road, as illustrated in FIG. 10, the torque Td of the power transmission shaft 35 detected by the torque sensor 66 indicates a negative value. In this case, at time T1, if the target shift range is changed from the parking range to the non-parking range, the pre-correction torque Tb is set to torque of the power transmission shaft 35 detected by the torque sensor 66 at the time point. Thereafter, at time t2, if the lock mechanism 51 shifts from a locked state to an unlocked state, when the torque correction control is not performed, as indicated by an alternate long and two short dashes line m10 in FIG. 10, the torque Td of the power transmission shaft 35 gradually increases from time t2. Thereafter, at time t3 at which the lock mechanism 51 becomes an unlocked state, the torque Tb detected by the torque sensor 66 becomes 0. In this case, force depending the pre-correction torque Tb is applied to the portion at which the parking gear 512 and the parking pawl 513 of the lock mechanism 51 engage with each other. This is a factor that the torque of the actuator unit 52 required for unlocking the lock mechanism 51 increases.

When the lock mechanism 51 shifts from a locked state to an unlocked state at time t2, if the state in which the pre-correction torque Tb is applied to the power transmission shaft 35 by output torque of the motor generator 31 can be kept, the torque of the actuator unit 52 required for unlocking the lock mechanism 51 can be decreased. That is, when the torque correction amount "ΔT+ε" set in the process illustrated in FIG. 6 is appropriate, as indicated by a solid line m11 in FIG. 10, from time t2, the torque Td of the power transmission shaft 35 is kept to the pre-correction torque Tb. The during-correction torque Ta is set to the torque of the power transmission shaft 35 detected by the torque sensor 66 at time t4. In this case, since the pre-correction torque Tb is equal to the during-correction torque Ta, the learning value ε is not corrected. That is, the learning value ε is kept to the previous value thereof. Thereafter, when the torque correction control ends at time t5, the torque Td of the power transmission shaft 35 thereafter gradually increases.

When the torque correction amount "ΔT+c" is excessively large, torque larger than the pre-correction torque Tb is applied to the power transmission shaft 35. Hence, as illustrated by an alternate long and short dash line m12 in FIG. 10, the torque of the power transmission shaft 35 gradually decreases from time t2. In this case, the absolute value |Ta| of the during-correction torque detected at time t4 is smaller than the absolute value |Tb| of the pre-correction torque Tb. Hence, processing of subtracting the predetermined value α from the current learning value ε is performed to determine a new learning value ε. As a result, since the torque correction amount "ΔT+ε" set in the next torque correction control becomes small, the during-correction torque Ta can be close to the pre-correction torque Tb. Hence, the torque of the actuator unit 52 required for unlocking the lock mechanism 51 can be reduced.

When the torque correction amount "ΔT+ε" is excessively small, torque smaller than the pre-correction torque Tb is applied to the power transmission shaft 35. Hence, as illustrated by an alternate long and short dash line in FIG. 10, the torque of the power transmission shaft 35 increases from time t2. In this case, the absolute value |Ta| of the during-correction torque detected at time t4 is larger than the absolute value |Tb| of the pre-correction torque Tb. Hence, processing of adding the predetermined value α to the current learning value ε is performed to determine a new learning value ε. As a result, since the torque correction amount "ΔT+ε" set in the next torque correction control becomes large, the during-correction torque Ta can be close to the pre-correction torque Tb. Hence, the torque of the actuator unit 52 required for unlocking the lock mechanism 51 can be reduced.

As described above, in the MGECU 71 of the present embodiment, every time the lock mechanism 51 is unlocked, the learning value ε is updated so as to be a value by which the pre-correction torque Tb and the during-correction torque Ta can be equal to each other. Hence, the torque correction amount "ΔT±ε" set in the processing in step S17 in FIG. 6 can be set to a more appropriate value.

Next, an example of operation of the vehicle 10 of the present embodiment will be described.

Figure 11:
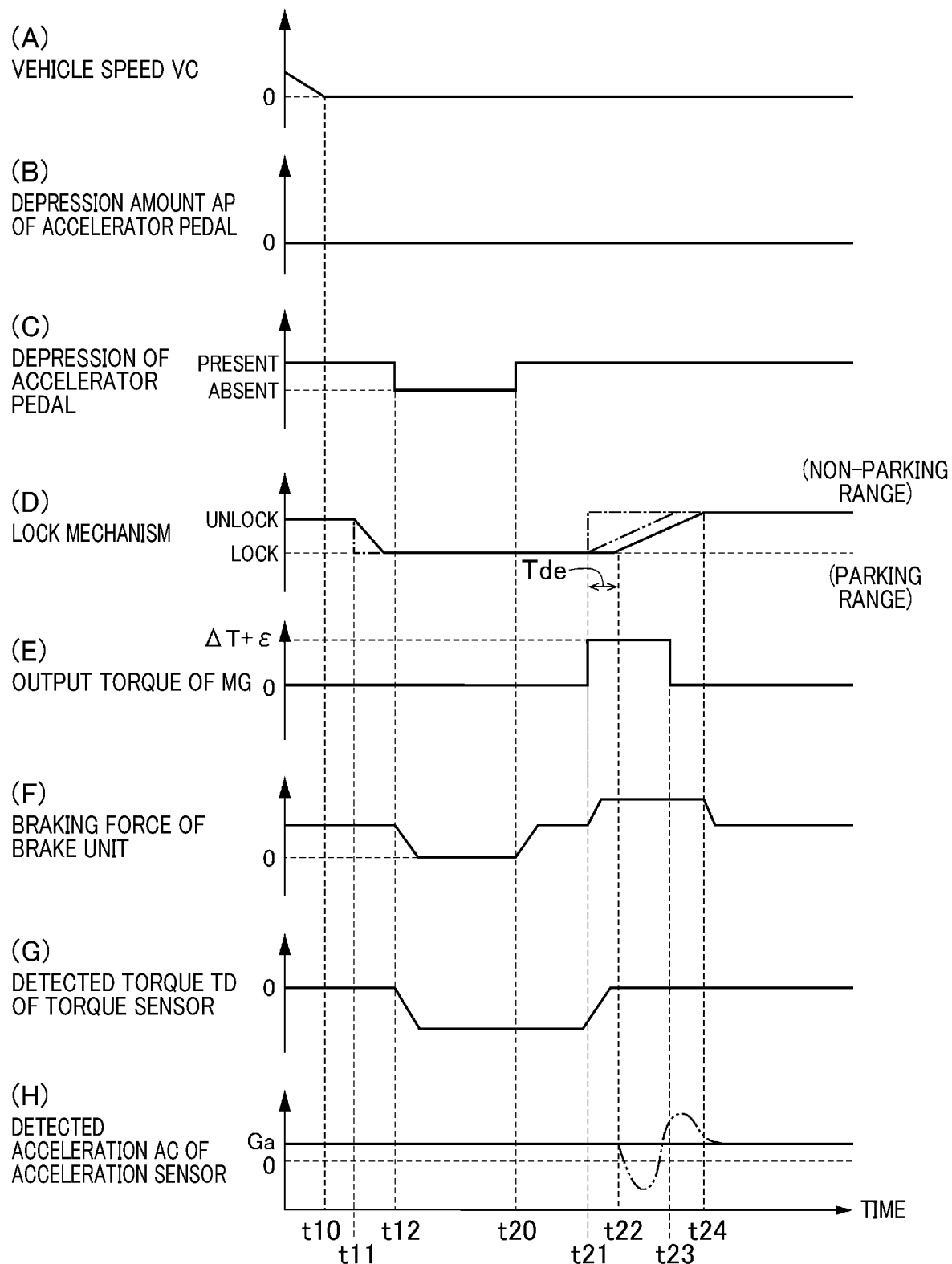
FIGS. 11 (A) to (H) are time diagrams illustrating a vehicle speed, a depression amount of an accelerator pedal, presence or absence of depression of a brake pedal, a state of the lock mechanism, output torque of a motor generator, braking force of a brake unit, detected torque of a torque sensor, and a change of detected acceleration of an acceleration sensor.

As illustrated in FIG. 11 (A), (B), it is assumed that, at t10, the vehicle 10 is stopped on an uphill road, and the vehicle speed VC and the depression amount AP of the accelerator pedal are "0". At this time, if the driver is depressing the brake pedal, the depression of the brake pedal is detected as illustrated in FIG. 11(C). Thereafter, at time t11, if the operation range of the shift lever is changed from the non-parking range such as a drive range to the parking range, as indicated by an alternate long and short dash line in FIG. 11(D), the target shift range of the SBW system 50 is changed from the non-parking range to the parking range. Hence, as indicated by a solid line in FIG. 11(D), the lock mechanism 51 shifts from an unlocked state to a locked state. Thereafter, as illustrated in FIG. 11(C), at time t12, if the driver releases his foot from the brake pedal, braking force of the brake units 41 to 44 changes to 0 as illustrated in FIG. 11(F). As the braking force of the brake units 41 to 44 approaches to 0, face based on gravity of the vehicle 10 acts on the power transmission shaft 35 via the drive wheels 13, 14. Hence, as illustrated in FIG. 11(G), torque of the power transmission shaft 35 detected by the torque sensor 66 becomes large in the negative direction. The negative torque acting on the power transmission shaft 35 is a factor that generates large power at the portion at which the parking gear 512 and the parking pawl 513 of the lock mechanism 51 engage with each other. As illustrated in FIG. 11(H), the acceleration sensor 65 detects acceleration of gravity Ga depending on a gradient of a road surface on which the vehicle 10 is stopped.

Thereafter, assuming that, as illustrated in FIG. 11(C), the driver depresses the brake pedal at time t20 to start the vehicle 10, as illustrated in FIG. 11(F), braking force of the brake units 41 to 44 increases. At time t21, if the driver operates the shift lever to change the operation range from the parking range to the non-parking range, as indicated by an alternate long and short dash line in FIG. 11(D), the target shift range of the SBW system 50 is changed from the parking range to the non-parking range. At this time, in the vehicle 10 of the present embodiment, as illustrated in FIG. 11(E), at time t21, the target torque T20* is corrected to the torque correction amount "ΔT+ε". Hence, output torque of the motor generator 31 increases.

When the delay request flag Fd is set to "1" at time t21, even if the target shift range of the SBW system 50 is changed from the parking range to the non-parking range, as indicated by a solid line in FIG. 11(D), the lock mechanism 51 is kept in a locked state. Then, from time t22 at which predetermined delay time Tde has elapsed from time t21, the lock mechanism 51 shifts from the locked state to an unlocked state. The predetermined delay time Tde corresponds to the delay value Cth set for the counter C, and is, for example, 1 sec.

When the delay request flag Fd is set to "0" at time t21, as indicated by an alternate long and two short dashes line in FIG. 11 (D), the lock mechanism 51 shifts from the locked state to the unlocked state from time t21.

As illustrated in FIG. 11(E), at time t22, since output torque of the motor generator 31 has been increased, force applied to the portion at which the parking gear 512 and the parking pawl 513 of the lock mechanism 5 engage with each other has become small. Hence, the force required for the actuator unit 52 to shift the lock mechanism 51 from the locked state to the unlocked state can be small. As a result, when the lock mechanism 51 is shifted to the unlocked state, a shock is difficult to cause in the lock mechanism 51. Hence, as illustrated in FIG. 11(H), acceleration AC detected by the acceleration sensor 65 does not vary as indicated by an alternate long and two short dashes line but shifts as indicated by a solid line.

Thereafter, at time t23, if the rotation angle θa of the actuator unit 52 is less than the predetermined value θth10, the target torque correction unit 710 determines that the lock mechanism 51 has become the unlocked state. Hence, as illustrated in FIG. 11(E), at time t23, the target torque T20* is changed from the torque correction amount "ΔT+ε" to "0".

When the vehicle 10 is stopped on a steep uphill road, as illustrated in FIG. 11(F), braking force of the brake units 41 to 44 starts to increase from time t21 at which the target shift range of the SBW system 50 changes from the parking range to the non-parking range. Thereafter, since the state in which the braking force of the brake units 41 to 44 has increased is kept until time t24 at which the torque correction control ends, unintended behavior of the vehicle 10 due to the correction of output torque of the motor generator 31 can be suppressed.

According to the control device 90 of the vehicle 10 according to the present embodiment described above, the following effects can be obtained.

(1) The SBWECU 73 drives the actuator unit 52 so as to unlock the power transmission shaft 35 locked by the lock mechanism 51 based on the change of the shift range of the SBW system 50 from the parking range to the non-parking range. The MGECU 71 performs of the torque correction control that corrects output torque of the motor generator 31 depending on the torque Td of the power transmission shaft 35 detected by the torque sensor 66, based on the change of the shift range of the SBW system 50 from the parking range to the non-parking range. According to this configuration, the torque depending on the torque Td applied to the power transmission shaft 35 is output from the motor generator 31. Hence, since power required for the actuator unit 52 to unlock the lock mechanism 51 can be small, such an electrical parking brake unit as disclosed in JP 2018-167655 A is unnecessary. Hence, power required for the actuator unit 52 can be reduced with a simpler configuration.

(2) The torque sensor 66 functions as a torque detection unit that directly detects torque applied to the power transmission shaft 35. According to this configuration, since the torque applied to the power transmission shaft 35 can be detected with high accuracy, output torque of the motor generator 31, which can reduce force applied to the portion at which the parking gear 512 and the parking pawl 513 of the lock mechanism 51 engage with each other, can be set more appropriately. Hence, power required for the actuator unit 52 can be reduced more accurately.

(3) If the torque Td of the power transmission shaft 35 detected by the torque sensor 66 is 0, or if the torque Td is less than a predetermined value, the MGECU 71 does not perform the torque correction control. According to this configuration, since the torque correction control is not performed in a state in which the motor generator 31 is not required to be driven, unnecessarily driving the motor generator 31 can be avoided.

(4) The torque sensor 66 detects the pre-correction torque Tb, which is applied to the power transmission shaft 35 immediately before the torque correction control is performed, and the during-correction torque Ta, which applied to the power transmission shaft 35 when the torque correction control is being performed. The MGECU 71 sets the learning value ε based on a comparison between the pre-correction torque Tb and the during-correction torque Ta to learn the torque correction amount "ΔT±ε" to be output from the motor generator 31 by performing the torque correction control. According to this configuration, the torque correction amount "ΔT±ε" can be set with high accuracy.

(5) If the absolute value |Tb| of the pre-correction torque is more than the absolute value |Ta| of the during-correction torque, the MGECU 71 performs the correction, as learning of the torque correction amount, so that the learning value ε becomes large, in other words, so that the absolute value of the torque correction amount "ΔT±ε" becomes large. If the absolute value |Tb| of the pre-correction torque is less than the absolute value |Ta| of the during-correction torque, the MGECU 71 performs the correction so that the learning value ε becomes small, in other words, so that the absolute value of the torque correction amount "ΔT±ε" becomes small. According to this configuration, the torque correction amount "ΔT±ε" can be set with high accuracy.

The above embodiment can be implemented as below.

Figure 12:
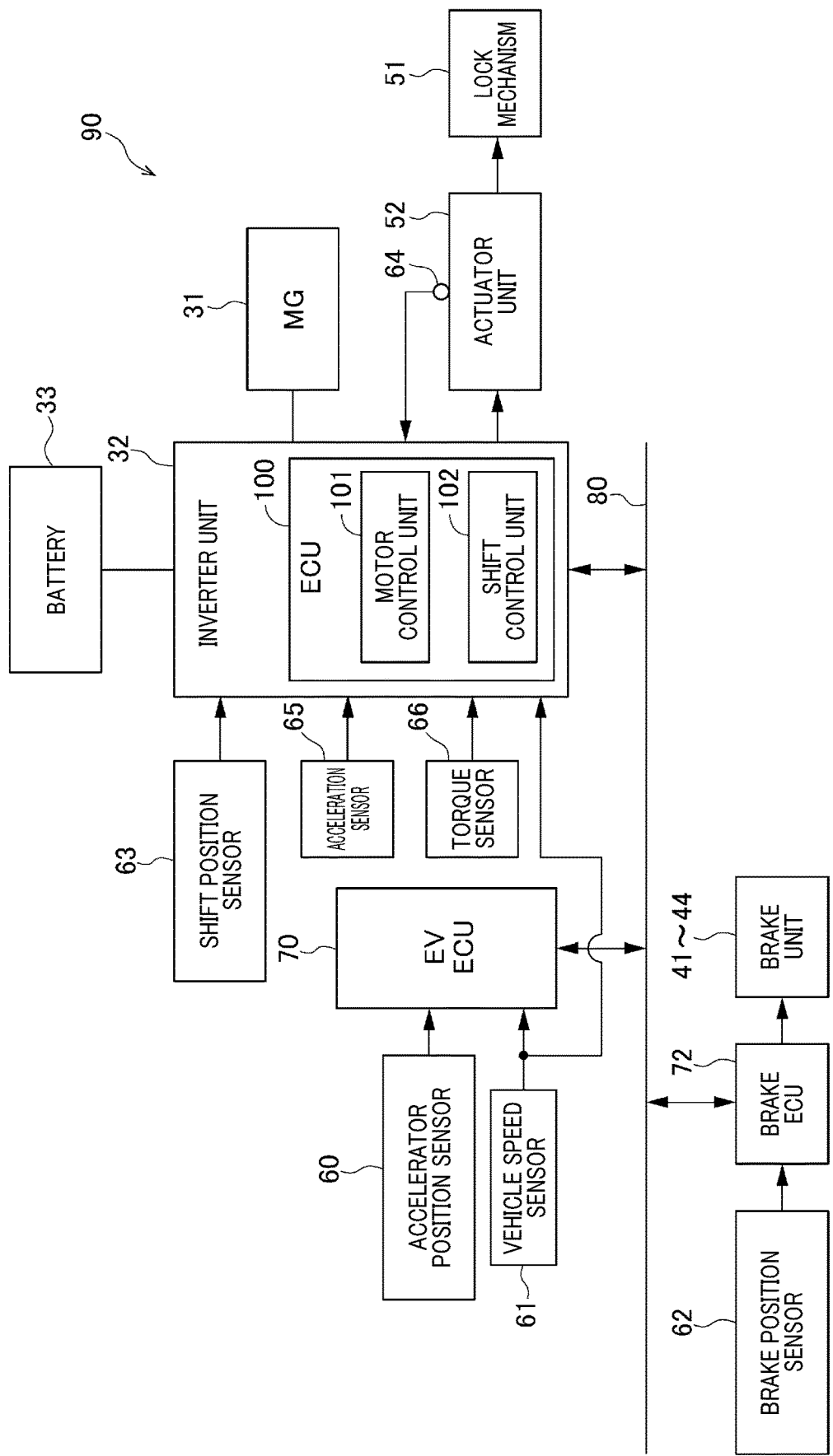
FIG. 12 is a block diagram illustrating a schematic configuration of a control device of a vehicle according to another embodiment.

As illustrated in FIG. 12, the inverter unit 32 may include an ECU 100 having a motor control unit 101 and a shift control unit 102. The motor control unit 101 has the same function as that of the MGECU 71 of the first embodiment or a function similar to that of the MGECU 71 of the first embodiment. The shift control unit 102 has the same function as that of the SBWECU 73 of the first embodiment or a function similar to that of the SBWECU 73 of the first embodiment. According to the configuration, compared with a configuration in which the MGECU 71 and the SBWECU 73 are separately provided as in the control device 90 of the first embodiment, the torque correction control of the motor generator 31 and the control of the lock mechanism 51 can cooperate with each other more quickly. As a result, a shock in the lock mechanism 51 can be further reduced.

The control device 90 disclosed in the present disclosure and the control method executed by the control device 90 may be implemented by one or more dedicated computers including a processor and a memory programmed to execute one or more functions embodied by computer programs. The control device 90 disclosed in the present disclosure and the control method executed by the control device 90 may be implemented by a dedicated computer including a processor formed of one or more dedicated hardware logical circuits. The control device 90 disclosed in the present disclosure and the control method executed by the control device 90 may be implemented by one or more dedicated computers including a combination of a processor and a memory programmed to execute one or more functions and a processor including one or more hardware logical circuits. The computer programs may be stored, as instructions to be executed by a computer, in a computer-readable non-transient tangible storage medium. The dedicated hardware logical circuit and the hardware logical circuit may be implemented by a digital circuit including a plurality of logical circuits or an analog circuit.

The present disclosure is not limited to the above examples. Configurations to which design change is made by a person skilled in the art are also included in the scope of the present disclosure as long as the configurations includes a feature of the present disclosure. The elements included in the examples described above, and the arrangements, conditions, shapes, and the like of the elements are not limited but can be modified appropriately. The elements included in the example described above can be appropriately combined with each other unless technical inconsistency is caused.

As an aspect of the present disclosure, a control device (90) for a movable body (10) is provided. The movable body has an electric motor (31) that transmits torque to a rotating body (13, 14) via a power transmission mechanism (35) to cause the movable body (10) to travel, a lock mechanism (51) that is capable of changing the power transmission mechanism between a locked state and an unlocked state, and an actuator unit (52) that drives the lock mechanism. The control device includes: a motor control unit (71, 101) that controls the electric motor; a shift control unit (73, 102) that controls a shift by wire system of the movable body; and a torque detection unit (66) that detects torque applied to the power transmission mechanism. When a shift range that is changeable in the shift by wire system and is other than a parking range is defined as a non-parking range, the shift control unit drives the actuator unit so that the power transmission mechanism locked by the lock mechanism is unlocked, based on a change of the shift range of the shift by wire system from the parking range to the non-parking range, and the motor control unit controls output of the electric motor depending on detected torque of the torque detection unit, based on the change of the shift range of the shift by wire system from the parking range to the non-parking range.

According to this configuration, the torque depending on the torque applied to the power transmission shaft is output from the motor generator. Hence, since power required for the actuator unit to unlock the lock mechanism can be small, such an electrical parking brake unit as disclosed in JP 2018-167655 A is unnecessary. Hence, power required for the actuator unit can be reduced with a simpler configuration.

What is claimed is:

1. A control device for a movable body, the movable body having an electric motor that transmits torque to a rotating body via a power transmission mechanism to cause the movable body to travel, a lock mechanism that is capable of changing the power transmission mechanism between a locked state and an unlocked state, and an actuator unit that drives the lock mechanism, the control device comprising:

a motor control unit that controls the electric motor;

a shift control unit that controls a shift by wire system of the movable body; and a torque detection unit that detects torque applied to the power transmission mechanism, wherein when a shift range that is changeable in the shift by wire system and is other than a parking range is defined as a non-parking range, the shift control unit drives the actuator unit so that the power transmission mechanism locked by the lock mechanism is unlocked, based on a change of the shift range of the shift by wire system from the parking range to the non-parking range, and the motor control unit controls output of the electric motor depending on detected torque of the torque detection unit, based on the change of the shift range of the shift by wire system from the parking range to the non-parking range.

2. The control device according to claim 1, wherein the torque detection unit is a torque sensor that directly detects torque applied to the power transmission mechanism.

3. The control device according to claim 1, wherein if the detected torque is 0, or the detected torque is less than a predetermined value, the motor control unit does not perform output control of the electric motor depending on the detected torque.

4. The control device according to claim 1, wherein the torque detection unit detects pre-correction torque, which is applied to the power transmission mechanism immediately before output control of the electric motor is performed depending on the detected torque, and during-correction torque, which is applied to the power transmission mechanism when the output control of the electric motor is being performed depending on the detected torque, and the motor control unit learns a torque correction amount to be output from the electric motor by the output control of the electric motor depending on the detected torque, based on a comparison between the pre-correction torque and the during-correction torque.

5. The control device according to claim 4, wherein as learning of the torque correction amount, if an absolute value of the pre-correction torque is more than an absolute value of the during-correction torque, the motor control unit corrects the torque correction amount so that an absolute value of the torque correction amount becomes large, and if the absolute value of the pre-correction torque is less than the absolute value of the during-correction torque, the motor control unit corrects the torque correction amount so that the absolute value of the torque correction amount becomes small.

* * * * *